United States Patent
Ang et al.

(10) Patent No.: US 11,778,552 B2
(45) Date of Patent: Oct. 3, 2023

(54) TRACKING REFERENCE SIGNAL (TRS) FOR IDLE MODE USER EQUIPMENT (UE)

(71) Applicant: QUALCOMM Incorporated, San Diego, CA (US)

(72) Inventors: Peter Pui Lok Ang, San Diego, CA (US); Peter Gaal, San Diego, CA (US); Nathan Yee, Saratoga, CA (US); Hung Dinh Ly, San Diego, CA (US); Wooseok Nam, San Diego, CA (US); Linhai He, San Diego, CA (US); Wanshi Chen, San Diego, CA (US); Huilin Xu, Temecula, CA (US); Yuchul Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/225,973

(22) Filed: Apr. 8, 2021

(65) Prior Publication Data
US 2021/0321330 A1    Oct. 14, 2021

Related U.S. Application Data

(60) Provisional application No. 63/007,887, filed on Apr. 9, 2020.

(51) Int. Cl.
*H04W 52/02* (2009.01)
*H04W 68/02* (2009.01)
*H04W 72/1273* (2023.01)

(52) U.S. Cl.
CPC ....... *H04W 52/0216* (2013.01); *H04W 68/02* (2013.01); *H04W 72/1273* (2013.01)

(58) Field of Classification Search
None
See application file for complete search history.

(56) References Cited

U.S. PATENT DOCUMENTS

| | | | | |
|---|---|---|---|---|
| 10,812,238 | B2 * | 10/2020 | Zhang | H04B 7/088 |
| 2019/0104005 | A1 * | 4/2019 | Kim | H04W 72/0453 |
| 2019/0116012 | A1 * | 4/2019 | Nam | H04W 72/046 |
| 2019/0215117 | A1 * | 7/2019 | Lee | H04L 5/0048 |
| 2020/0029302 | A1 * | 1/2020 | Cox | H04W 68/02 |
| 2020/0037247 | A1 * | 1/2020 | Liao | H04W 72/0453 |

(Continued)

FOREIGN PATENT DOCUMENTS

| | | | | |
|---|---|---|---|---|
| BR | 112020020446-3 A2 * | 12/2021 | | H04L 5/0096 |
| WO | WO-2013070023 A1 * | 5/2013 | | H04L 5/0005 |

(Continued)

OTHER PUBLICATIONS

International Search Report and Written Opinion—PCT/US2021/026700—ISA/EPO—dated Jul. 2, 2021.

*Primary Examiner* — Jamaal Henson
(74) *Attorney, Agent, or Firm* — Seyfarth Shaw LLP

(57) ABSTRACT

A method of wireless communication by a base station includes configuring a tracking reference signal (TRS) with respect to a physical downlink shared channel (PDSCH) for an idle/inactive mode user equipment (UE). The method also transmits the tracking reference signal and the PDSCH during a paging cycle, in accordance with the configuration. A method of wireless communication by a UE includes expecting a TRS to be received when a PDSCH is received.

27 Claims, 10 Drawing Sheets

(56) References Cited

U.S. PATENT DOCUMENTS

| | | | | |
|---|---|---|---|---|
| 2020/0146107 A1* | 5/2020 | Xiong | ................ | H04W 68/005 |
| 2020/0229092 A1* | 7/2020 | Wu | .................. | H04W 52/0219 |
| 2020/0287678 A1* | 9/2020 | Li | ...................... | H04L 27/2613 |
| 2020/0305232 A1* | 9/2020 | Miao | ................... | H04W 68/02 |
| 2020/0404617 A1* | 12/2020 | Murray | ............ | H04W 52/0229 |
| 2021/0153162 A1* | 5/2021 | Chen | ................ | H04W 72/0453 |
| 2021/0195517 A1* | 6/2021 | Yang | ................ | H04W 52/0229 |
| 2021/0212101 A1* | 7/2021 | Jiang | .................. | H04W 76/11 |
| 2023/0063026 A1* | 3/2023 | Reial | ................... | H04W 72/23 |

FOREIGN PATENT DOCUMENTS

| | | | | |
|---|---|---|---|---|
| WO | WO-2018175760 A1 * | 9/2018 | ........ | H04W 52/0216 |
| WO | 2019029711 A1 | 2/2019 | | |
| WO | 2019046005 A1 | 3/2019 | | |
| WO | WO-2019046005 A1 * | 3/2019 | ............... | H04B 1/38 |
| WO | WO-2021160647 A1 * | 8/2021 | | |
| WO | WO-2021162623 A1 * | 8/2021 | ........ | H04W 52/0229 |

\* cited by examiner

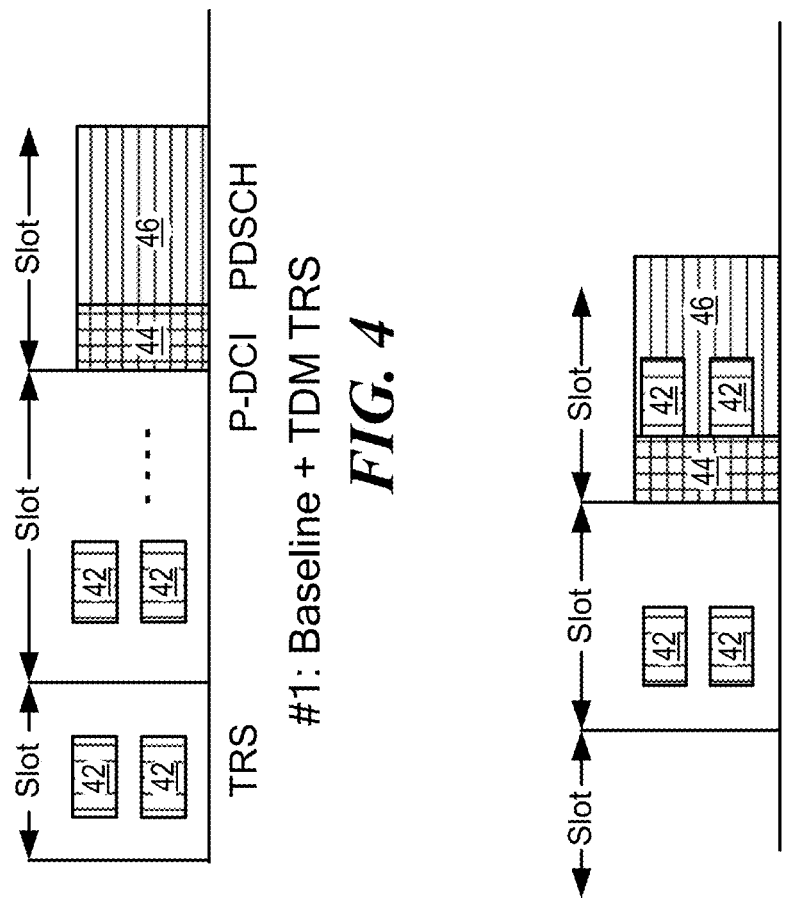

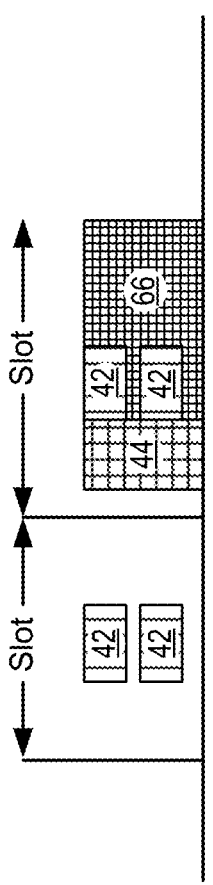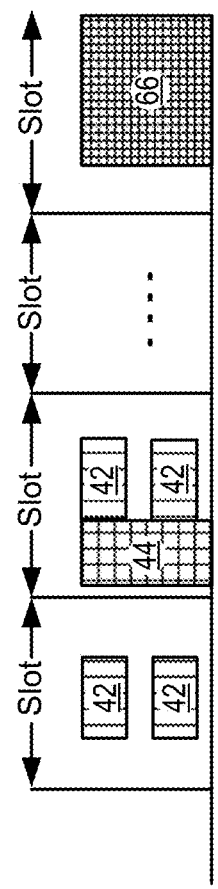

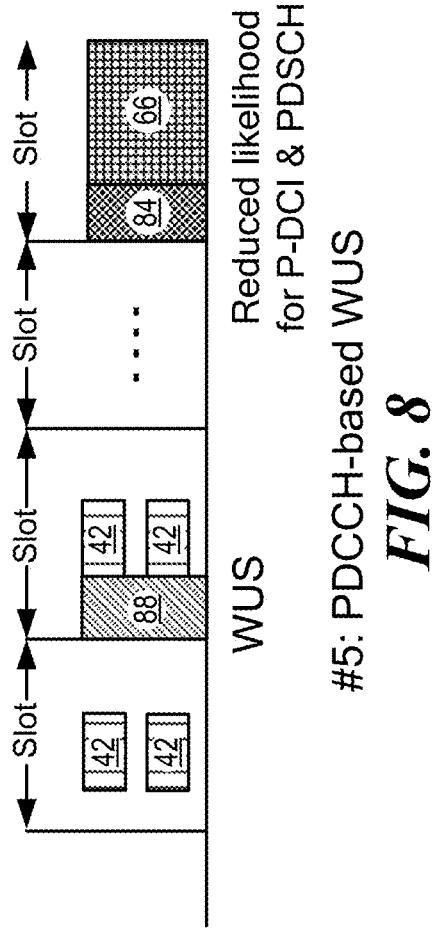
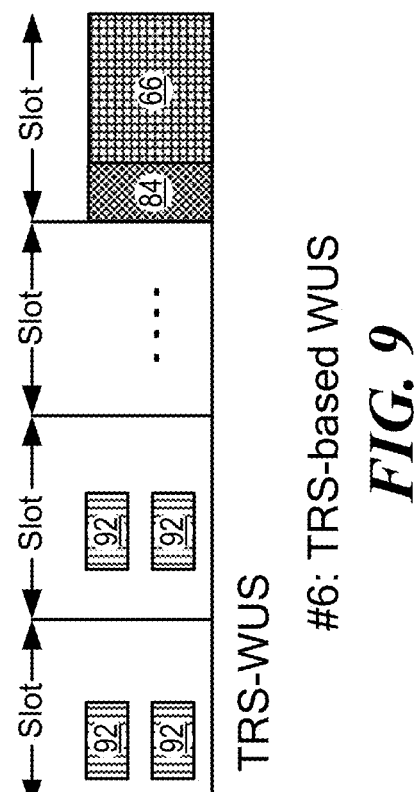

TRACKING REFERENCE SIGNAL (TRS) FOR IDLE MODE USER EQUIPMENT (UE)

CROSS-REFERENCE TO RELATED APPLICATION

The present application claims the benefit of U.S. Provisional Patent Application No. 63/007,887, filed on Apr. 9, 2020, and titled "TRACKING REFERENCE SIGNAL (TRS) FOR IDLE MODE USER EQUIPMENT (UE)," the disclosure of which is expressly incorporated by reference in its entirety.

FIELD OF THE DISCLOSURE

Aspects of the present disclosure generally relate to wireless communications, and more particularly to techniques and apparatuses for 5G new radio (NR) tracking reference signals for idle mode user equipment (UE) power saving.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

Power saving is important for UEs. A UE can enter an inactive or idle mode to conserve battery power. During idle (for LTE/NR UEs)/inactive (for NR UEs) mode operation, the UE periodically monitors a paging channel to receive paging messages from the base station. The UE may also be configured to monitor reference signals, such as a tracking reference signal (TRS), when the UE is in the inactive mode or the idle mode. It would be desirable to configure the TRS to allow idle/inactive mode UEs to save power.

SUMMARY

In one aspect of the present disclosure, a method of wireless communication by a base station includes configuring a tracking reference signal (TRS) with respect to a paging occasion for an idle/inactive mode user equipment (UE). The method also includes transmitting the tracking reference signal during a paging cycle corresponding to the paging occasion, in accordance with the configuration.

In another aspect of the present disclosure, a method of wireless communication by a user equipment (UE) includes monitoring for a tracking reference signal (TRS) during a period when a physical downlink shared channel (PDSCH) is received.

In another aspect of the present disclosure, an apparatus of a base station for wireless communication includes a memory and at least one processor operatively coupled to the memory. The memory and the processor(s) are able to configure a tracking reference signal (TRS) with respect to a paging occasion for an idle/inactive mode user equipment (UE). The apparatus is also configured to transmit the tracking reference signal during a paging cycle corresponding to the paging occasion, in accordance with the configuration.

In another aspect of the present disclosure, an apparatus of a user equipment (UE) for wireless communication includes a memory and at least one processor operatively coupled to the memory. The memory and the processor(s) are configured to monitor for a tracking reference signal (TRS) during a period when a physical downlink shared channel (PDSCH) is received.

In another aspect of the present disclosure, an apparatus of a base station for wireless communication includes means for configuring a tracking reference signal (TRS) with respect to a paging occasion for an idle/inactive mode user equipment (UE). The apparatus also includes means for transmitting the tracking reference signal and the PDSCH during a paging cycle corresponding to the paging occasion, in accordance with the configuration.

In still another aspect of the present disclosure, an apparatus of a UE for wireless communication includes means for monitoring for a tracking reference signal (TRS) during a period when a physical downlink shared channel (PDSCH) is received. The apparatus also includes means for communicating in accordance with the monitoring.

In another aspect of the present disclosure, a non-transitory computer-readable medium with non-transitory program code recorded thereon is disclosed. The program code is executed by a base station and includes program code to configure a tracking reference signal (TRS) with respect to a paging occasion for an idle/inactive mode user equipment (UE). The base station also includes program code to transmit the tracking reference signal and the PDSCH during a paging cycle corresponding to the paging occasion, in accordance with the configuration.

In another aspect of the present disclosure, a non-transitory computer-readable medium with non-transitory program code recorded thereon is disclosed. The program code is executed by a user equipment (UE) and includes program code to monitor for a tracking reference signal (TRS) during a period when a physical downlink shared channel (PDSCH) is received.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

FIG. 4 is a diagram illustrating a tracking reference signal (TRS) configuration, in accordance with aspects of the present disclosure.

FIG. 5 is a diagram illustrating a tracking reference signal (TRS) configuration, in accordance with aspects of the present disclosure.

FIG. 6 is a diagram illustrating a tracking reference signal (TRS) configuration, in accordance with aspects of the present disclosure.

FIG. 7 is a diagram illustrating a tracking reference signal (TRS) configuration, in accordance with aspects of the present disclosure.

FIG. 8 is a diagram illustrating a tracking reference signal (TRS) configuration, in accordance with aspects of the present disclosure.

FIG. 9 is a diagram illustrating a tracking reference signal (TRS) configuration, in accordance with aspects of the present disclosure.

DETAILED DESCRIPTION

Figure 1:
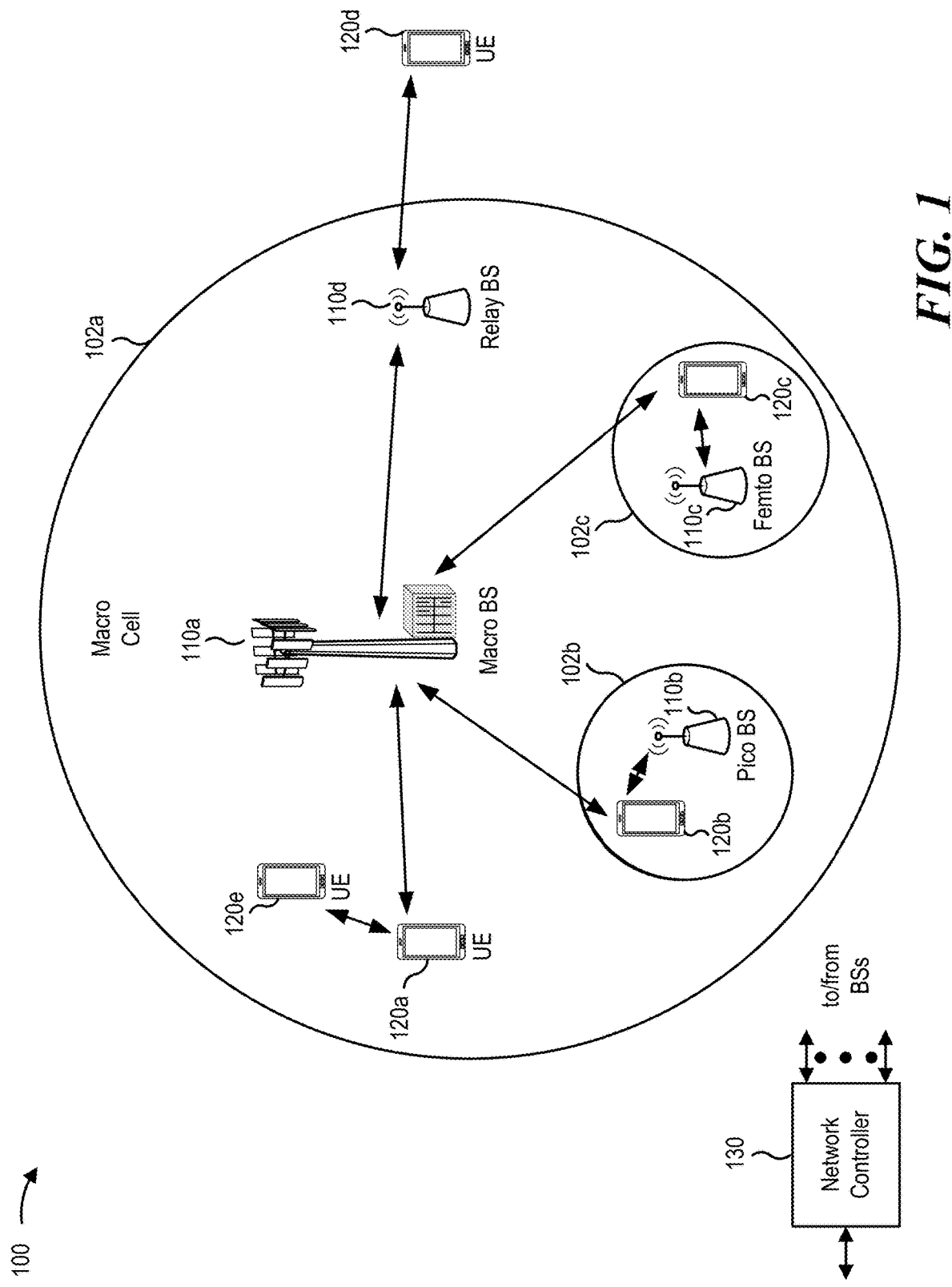
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method that is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Power saving is important for UEs. A UE can enter an inactive or idle mode to conserve battery power. During idle (for LTE or NR UEs) or inactive (for NR UEs) mode operation, the UE periodically monitors a paging channel to receive paging messages from the base station. When not monitoring, the UE is able to sleep and save power. If the UE does not detect a paging message indicating the presence of data or a call, the UE may go back to sleep until the next paging occasion.

The UE may also be configured to monitor reference signals, such as a tracking reference signal (TRS), when the UE is in the inactive mode or the idle mode. According to aspects of the present disclosure, configuring of the TRS can allow idle/inactive mode UEs to save power. Additional aspects of the present disclosure are directed to usage of a configured tracking reference signal (TRS) for purposes other than tracking.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
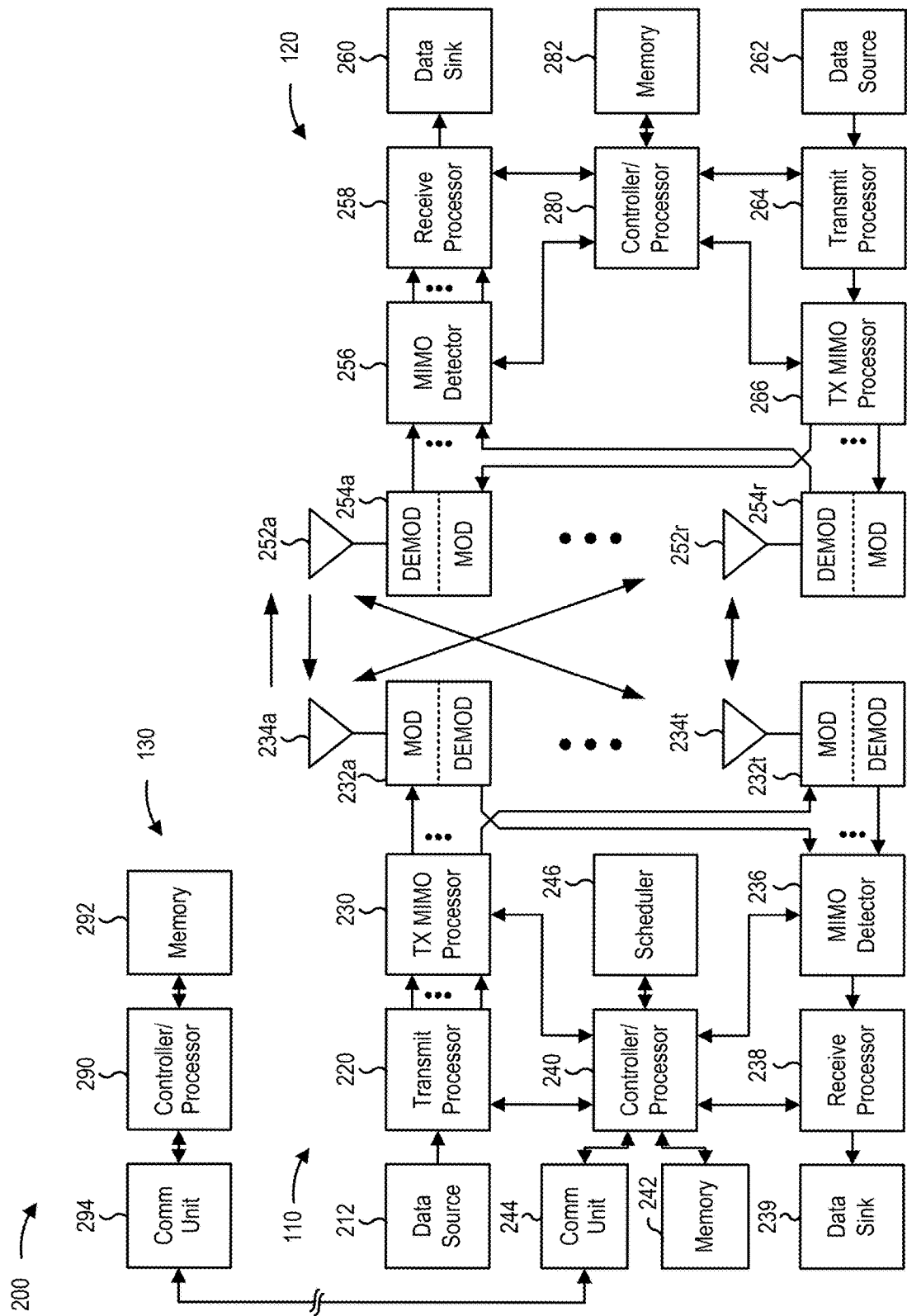
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for orthogonal frequency division multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for discrete Fourier transform spread OFDM (DFT-s-OFDM), cyclic prefix (CP)-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with tracking reference signals for power savings with idle/inactive mode UEs, as described in more detail elsewhere. For example, the controller/processor 240 of the base station 110, the controller/processor 280 of the UE 120, and/or any other component(s) of FIG. 2 may perform or direct operations of, for example, the process of FIG. 12 and/or other processes as described. Memories 242 and 282 may store data and program codes for the base station 110 and UE 120, respectively. A scheduler 246 may schedule UEs for data transmission on the downlink and/or uplink.

In some aspects, the base station 110 may include means for configuring, means for partitioning, means for scheduling, means for aligning and means for transmitting. The UE 120 may include means for expecting, means for monitoring, and means for communicating. Such means may include one or more components of the base station 110 and UE 120 described in connection with FIG. 2.

As indicated above, FIG. 2 is provided merely as an example. Other examples may differ from what is described with regard to FIG. 2.

Power saving is important for UEs. A UE may enter an inactive mode or idle mode to conserve battery power. During idle (for LTE or NR UEs) or inactive (for NR UEs) mode operation, the UE periodically monitors a paging channel during a paging occasion to receive paging messages from the base station. When not monitoring, the UE is able to sleep, saving power. If the UE does not detect a paging message indicating the presence of data or a call, the UE may go back to sleep until the next paging occasion. During the paging occasion, the UE decodes a physical downlink control channel (PDCCH) to obtain paging downlink control information (P-DCI). If the P-DCI so indicates, the UE will then decode the physical downlink shared channel (PDSCH) to obtain the paging message.

The UE may also be configured to monitor reference signals, such as a tracking reference signal (TRS), when the UE is in the inactive mode or the idle mode. A tracking reference signal includes four OFDM symbols in two consecutive slots. A base station may configure the UE with occasions for reference signals, during which the base station transmits the reference signals. According to the present disclosure, configuring of the TRS may allow idle/inactive mode UEs to save power.

An objective for power saving in idle/inactive mode includes specifying enhancements for idle/inactive mode UE power saving, considering system performance. Paging enhancements are desired to reduce unnecessary UE paging receptions, without impacting legacy UEs. Another objective is to specify potential tracking reference signal (TRS)/channel state information reference signal (CSI-RS) occasions available in connected mode to idle/inactive mode UEs, while reducing system overhead impact.

For a UE modem implementation that uses synchronization signal block (SSB) sets as input to a tracking loop (e.g., a frequency tracking loop (FTL) or time tracking time loop (TTL)), reception of one or more SSB sets may be needed, especially under poor channel conditions. The UE may be able to enter "light sleep" in between SSBs and/or paging occasions (POs), but overall this reduces deep sleep time and incurs multiple wake-up/go-to-sleep overhead. Moreover, the transition from light sleep to deep sleep consumes energy.

In LTE, a cell reference signal (CRS) is transmitted relatively often, which allows sample capture and enables offline processing of the signal. In 5G NR, there is no CRS, only SSBs as the reference signal (with typically a 20 msec periodicity). There is no offline mode due to the potential large gap between the SSB and the page.

Figure 3:
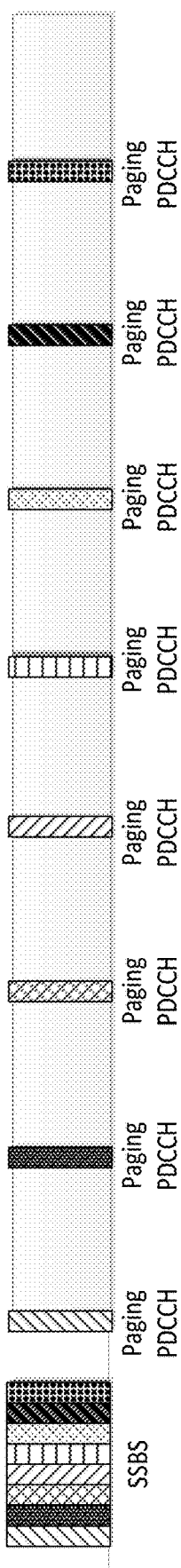
FIG. 3 is a diagram illustrating beam selection, in accordance with aspects of the present disclosure.

FIG. 3 is a diagram illustrating beam selection, in accordance with aspects of the present disclosure. As seen in FIG. 3, for FR1 (frequency range one-sub 6 GHz), a page may be beamformed, where up to eight beamformed SSBs may be transmitted and up to eight beamformed copies of the page (with a one-to-one correspondence to the SSBs) will be transmitted. In FIG. 3, each pattern represents a different beam direction. Thus, the SSB set includes the set of SSBs for all directions. The UE selects the best beam based on the SSBs and decodes the corresponding page.

It is desirable to make a tracking reference signal/channel state information reference signal (TRS/CSI-RS) available to idle/inactive mode UEs to help with tracking loops. Because the UE is not in a connected state, alternative methods enable signaling TRS/CSI-RS information to idle/inactive UEs. A first method utilizes a short message (e.g., a physical downlink control channel (PDCCH) with cyclic redundancy check (CRC) scrambled by a paging radio network temporary identifier (P-RNTI)). Reserved bits in DCI format 1_0 for the short message may be used. A second method utilizes a paging message (e.g., a physical downlink shared channel (PDSCH) scheduled by a PDCCH with CRC scrambled by a P-RNTI). A third method utilizes new paging downlink control information (DCI) signaling (e.g., a separate resource from legacy paging DCI) with a TRS/CSI-RS occasion configuration and the identifier for the paging/UE group.

Aspects of the present disclosure are directed to configuration options and conditions, along with tradeoffs with UE power saving. Additional aspects of the present disclosure are directed to usage of configured TRS/CSI-RS other than for tracking.

FIGS. 4-9 are diagrams illustrating tracking reference signal (TRS) configurations, in accordance with aspects of the present disclosure. Aspects of the present disclosure are directed to configuration options for UE power saving. In one aspect, a TRS 42 is not aligned to a paging occasion (PO) 44, as seen in FIG. 4. That is, the TRS 42 arrives at least one slot before the paging-downlink control information (P-DCI) of the paging occasion 44. During the paging occasion 44, the UE decodes a physical downlink control channel (PDCCH) to obtain paging downlink control information (P-DCI). If the P-DCI so indicates, the UE will then decode a physical downlink shared channel (PDSCH) 46 to obtain the paging message. This time division multiplexed (TDM) TRS 42 is beneficial for UE power saving when the configuration reduces the number of SSBs needed for reception within a paging cycle, for example, when channel conditions are poor. That is, the TRS 42 can supplement or replace SSBs for tracking. Thus, SSBs may be sent less frequently.

As seen in FIG. 5, the TRS 42 may be aligned to the PO 44. The UE may save power by reducing the number of wake-ups within a paging cycle. That is, the UE can awaken once for both the TRS 42 and the P-DCI of the PO 44. If the P-DCI so indicates, the UE will then decode the physical downlink shared channel (PDSCH) 46 to obtain the paging message. The UE may also perform offline processing. For example, the UE may capture samples and run the FTL/TTL on the TRS 42, for page detection. It is noted that it is easier for the base station to align the TRS 42 (which can be UE/group-specific) to the PO 44, compared to aligning the SSB to the PO 44. It is also noted that this configuration seen in FIG. 5 can support unaligned TRS/PO. That is, frequency division multiplexing (FDM) may still occur. Although full frequency division multiplexing is shown in FIG. 5, the present disclosure also contemplates partial frequency division multiplexing.

FIG. 6 illustrates an enhanced paging DCI design/configuration that is similar to the configuration shown in FIG. 5. In the configuration of FIG. 6, however, a group of UEs on the same PO 44 that would monitor paging DCI with the same P-RNTI is partitioned. In other words, UEs belonging to the same PO 44 may be partitioned into multiple groups (e.g., associated with different P-RNTIs). Because of the partitioning, in the configuration shown in FIG. 6, there is a reduced likelihood of PDSCH decoding. Thus, a PDSCH 66 in FIG. 6 is represented differently from the PDSCH 46 shown in FIGS. 4 and 5. According to further aspects, a different TRS 42 may be associated with different groups.

FIG. 7 illustrates an enhanced paging DCI design/configuration. In the configuration of FIG. 7, a non-zero minimum offset (k0) for paging is supported. That is, the offset k0≥1 implements cross-slot scheduling for idle/inactive mode UEs. Cross-slot scheduling specifies the PDCCH including the P-DCI is scheduled one or more slots before the corresponding PDSCH 66. Cross-slot scheduling may save power because the UE only warms up enough hardware to decode the paging DCI (and processes the TRS for loop tracking, if needed) at the PO 44. Only if the DCI is successfully decoded, the UE warms up the hardware for PDSCH processing. Assuming the DCI decode rate is low, cross-slot scheduling prevents the UE from unnecessarily expending energy to prepare for PDSCH reception/decoding. The assumption is reasonable because the paging rate is typically very low. Although FIG. 7 shows cross-slot scheduling in conjunction with partitioned UEs (seen by the representation of the PDSCH 66), cross-slot scheduling may operate without partitioning the UEs. In FIG. 7, the TRS 42 aligns with the PO 44.

FIG. 8 illustrates another TRS configuration including a PDCCH-based wake-up signal (WUS) 88. The wake-up signal 88, instead of the paging DCI (P-DCI), indicates in advance of a PO 84 whether the UE should wake up to decode the paging DCI and PDSCH 66. The wake-up signal (WUS) 88 is aligned with the TRS 42. In the example of FIG. 8, the paging occasion is partitioned and is represented differently than the paging occasion 46 of FIG. 4.

FIG. 9 illustrates another TRS configuration in which a TRS-based wake-up signal is present. A TRS 92 is used as a wake-up signal in some options, where the existence of the TRS 92 may be used to infer whether the UE should decode the P-DCI at the PO 84 and also the PDSCH 66. One issue with this option is that if the UE is not indicated to wake-up for a long time, a TRS 92 is not present for a long time and the UE time/frequency tracking loops may not be able to base their references on a TRS 92. In another option, two different scrambling sequences are provided, one indicating wake-up, and the other indicating do not wake up. This option is better for the UE when the UE specifies the TRS 92 is always to be present, to maintain time/frequency tracking. The UE performs hypothesis testing. For example, if none of the UEs on the PO 84 are paged, the WUS is not transmitted and the UE can skip decoding of paging.

According to additional aspects of the present disclosure, a TRS may be transmitted only when a PDSCH is transmitted. That is, the base station may decide to transmit the TRS conditioned on the PDSCH being transmitted. This conditional sending of TRS occurs when the TRS is primarily used for PDSCH decoding. From the UE perspective, the UE expects the TRS to be transmitted when the PDSCH is transmitted.

Figure 10A:
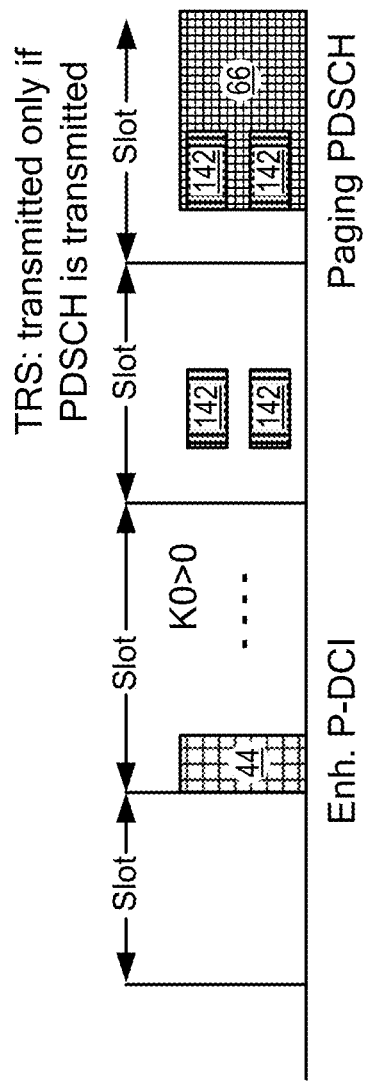
FIGS. 10A and 10B are diagrams illustrating tracking reference signal (TRS) configurations for paging physical downlink shared channel (PDSCH) decoding, in accordance with aspects of the present disclosure.
Figure 10B:
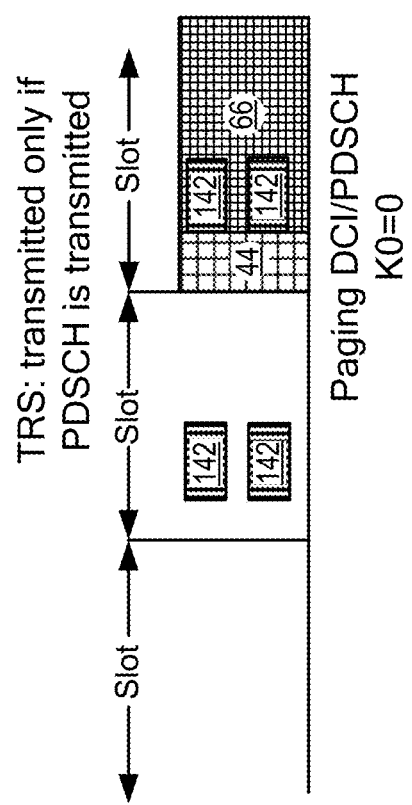

FIGS. 10A and 10B are diagrams illustrating tracking reference signal (TRS) configurations for paging physical downlink shared channel (PDSCH) decoding, in accordance with aspects of the present disclosure. A TRS 142 may overlap with a PDSCH 66 in time, as seen, for example, in FIGS. 10A and 10B. Overlap in time in this context means at least part of the TRS 142 and PDSCH 66 transmission are in a same slot. Time/frequency error requirements for decoding PDCCH are low and should be sufficient enough to drive tracking loops based on SSB alone. The TRS 142 is used only for loop refinement for PDSCH decoding. According to other aspects of the present disclosure, a transmitted PDCCH-demodulation reference signal (DM-RS) may also be used for loop refinement. The UE may use the PDCCH DM-RS in addition to the SSB set. Loop refinement refers to reducing time and frequency error for the UE relative to the base station.

The TRS 142 is intended to help with PDSCH decoding for two use cases including paging PDSCH 66 and other system information (OSI)/system information block (SIB) PDSCH 66. For the paging PDSCH 66, the TRS 142 aligns to the PDSCH 66 to reduce the number of wake-ups. In FIG. 10A, cross-slot scheduling is employed where the PO 44 for the paging DCI is in a slot before the PDSCH 66. The TRS 142 is transmitted only when the PDSCH 66 is transmitted. In FIG. 10B, conventional scheduling occurs where the paging DCI in the PO 44 is in the same slot as the PDSCH 66. In this case, the TRS 142 is also transmitted when the PDSCH 66 is transmitted. In FIGS. 10A and 10B, the TRS 142 is represented differently than the TRS 42 in FIGS. 4-9 due to the fact that the TRS 142 of FIGS. 10A-10B is conditional. That is, there is a reduced likelihood of the TRS 142 appearing. Although the occasional PDSCH 66 is shown, the standard PDSCH 46 is also contemplated.

A PDSCH may carry other system information (OSI)/system information block (SIB) within a paging cycle. The OSI/SIB PDSCH may be transmitted on multiple beams, for example, as discussed with reference to FIG. 3 for PDCCH. The portions of the PDSCH relevant to a particular UE may not be close to the beams of interest for the SSBs. Thus, the UE may have to wake up an extra time or remain active longer to receive the SSBs for decoding the OSI/SIB PDSCH, leading to higher power consumption. To address this issue, aspects of the present disclosure include TRSs configured to align with the OSI/SIB PDSCH (see, for example, FIG. 10B). The TRSs can drive the frequency tracking loops (FTLs) and time tracking loops (TTLs), replacing the use of SSBs for loop tracking. Moreover, it is easier for a network to configure TRS with better alignment to the OSI/SIB PDSCH.

If paging DCI is always in the same slot as its associated PDSCH, there is no ambiguity about paging occasion (PO) alignment. Aspects of the present disclosure address situations when the paging DCI is not always in the same slot as the associated PDSCH. For example, with the k0>0 proposal (discussed with respect to FIG. 7), paging DCI may be transmitted in a different slot than the associated PDSCH. There are several ways to define the relative alignment to PO when k0>0.

Figure 11A:
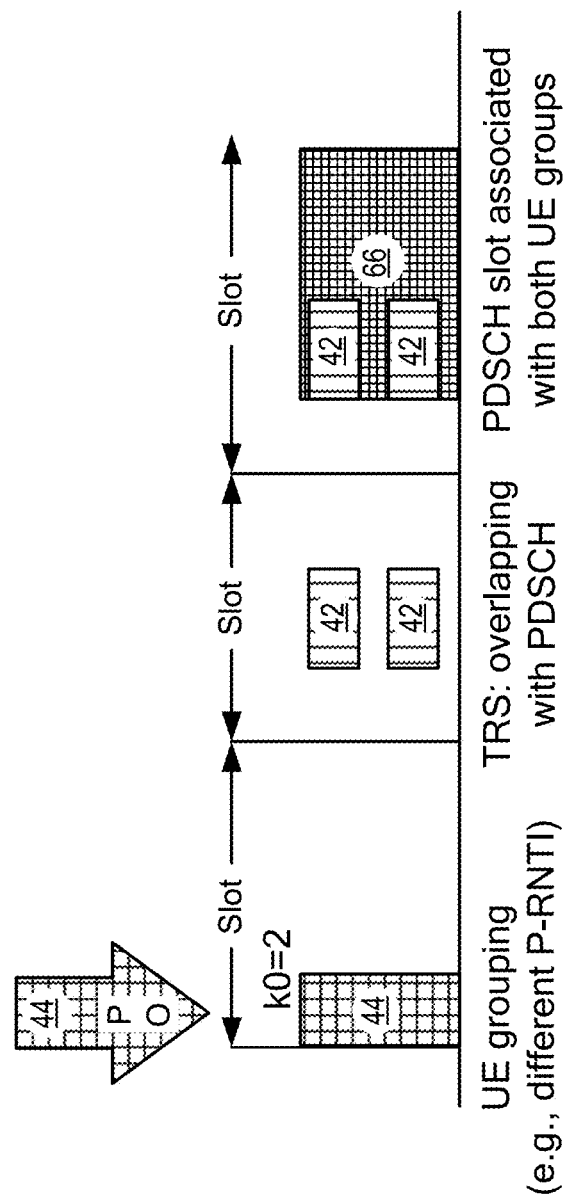
FIG. 11A is a diagram illustrating paging occasion (PO) alignment, in accordance with aspects of the present disclosure.

FIG. 11A is a diagram illustrating paging occasion (PO) alignment, in accordance with aspects of the present disclosure. In FIG. 11A, UEs may be split into two groups, for example based on P-RNTI. For one of the groups, the PDSCH 66 arrives two slots after the DCI (e.g., k0=2 as seen in FIG. 11A). In this case, the paging occasion (PO) 44 aligns with the DCI arriving two slots before the PDSCH 66. The PDSCH slot is associated with UEs from both groups in FIG. 11A and the TRS 42 overlaps with the PDSCH 66. An issue with this solution may occur with a legacy UE not built to support k0>0. In this case, for the same PO 44, multiple possible slot locations exist for the PDSCH 66 (and associated TRS 42 if overlap is desired).

Figure 11B:
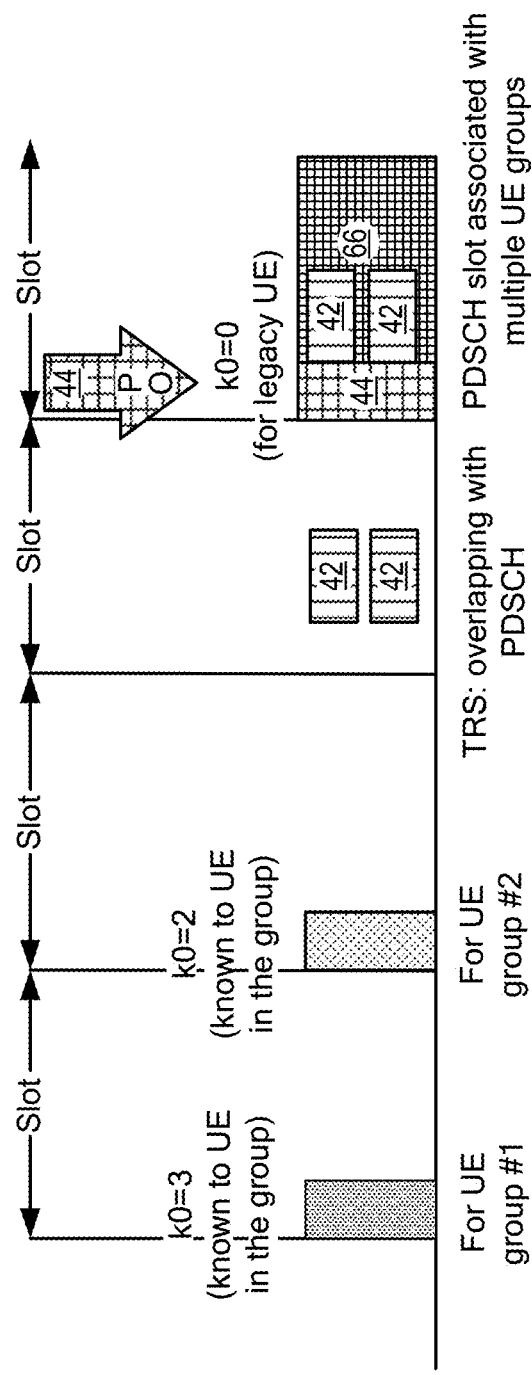
FIG. 11B is a diagram illustrating paging occasion (PO) alignment, in accordance with other aspects of the present disclosure.

FIG. 11B is a diagram illustrating paging occasion (PO) alignment, in accordance with other aspects of the present disclosure. FIG. 11B shows an alternate configuration for the paging occasion (PO) 44. In this configuration, the PO 44 aligns to the expected slot where PDSCH 66 could be transmitted. In this configuration, dynamically indicating k0 out of a range of possible values in the paging DCI does not help the UE to decide which slot to monitor for the DCI, relative to the PO 44. A fixed offset for k0 is indicated to the UE (for example, derived from the UE ID, and/or the P-RNTI used by the UE). Because PDSCH transmission should not happen frequently, it may be possible that several k0 offsets are supported from the same PDSCH slot. In the example shown in FIG. 11B, different groups of UEs are associated with different k0 offsets, which is another way to implement UE partitioning/grouping (working in conjunction with or without grouping by different P-RNTI).

FIG. 11B illustrates a special case where a first group of UEs is assigned k0=3 and a second group of UEs is assigned k0=2. Because legacy UEs built to support older versions of the standard do not support the k0>0 offset, the legacy UEs use the value k0=0. Hence, legacy UEs assume k0=0. In these aspects of the present disclosure, all UEs monitor for paging DCI at the PO 44 aligned with the slot where the PDSCH 66 could be transmitted. The TRS 42 overlaps the PDSCH 66.

As indicated above, FIGS. 3-11B are provided as examples. Other examples may differ from what is described with respect to FIGS. 3-11B.

Figure 12:
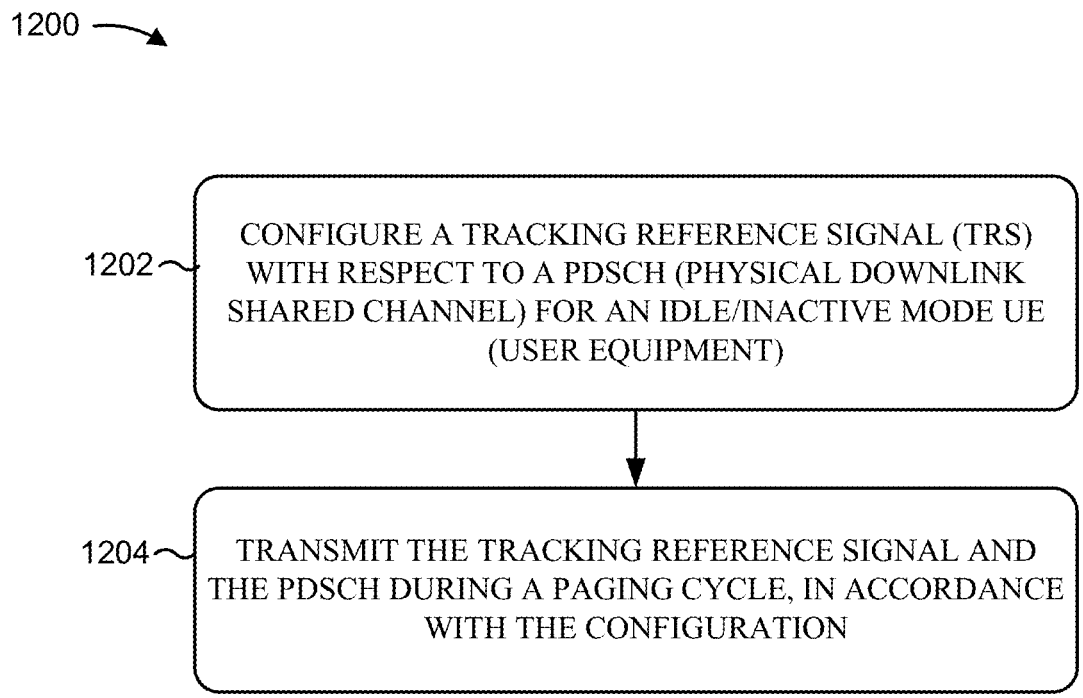
FIG. 12 is a flow diagram illustrating an example process performed, for example, by a base station, in accordance with various aspects of the present disclosure.

FIG. 12 is a flow diagram illustrating an example process 1200 performed, for example, by a base station, in accordance with various aspects of the present disclosure. The example process 1200 is an example of configuring and transmitting a tracking reference signal (TRS) for idle/inactive mode user equipment (UE).

As shown in FIG. 12, in some aspects, the process 1200 may include configuring a tracking reference signal (TRS) with respect to a PDSCH (physical downlink shared channel) for an idle/inactive mode UE (user equipment) (block 1202). For example, the base station (e.g., using the controller/processor 240, memory 242, and or the like) can configuring the tracking reference signal (TRS) with respect to the PDSCH. The TRS may be aligned with the paging occasion or aligned with a PDSCH associated with the paging occasion. In some examples, the TRS is frequency division multiplexed or time division multiplexed with the PDSCH.

As shown in FIG. 12, in some aspects, the process 1200 may include transmitting the tracking reference signal during a paging cycle corresponding to the paging occasion, in accordance with the configuration (block 1204). For example, the base station (e.g., using the antenna 234, MOD 232, TX MIMO processor 230, transmit processor 220, controller/processor 240, memory 242, and or the like) can transmit the tracking reference signal and the PDSCH. In some examples, the base station partitions a group of UEs into different groups, and transmits a different TRS to each group. In other examples, the TRS functions a wake up signal to instruct a UE to later monitor for the paging occasion. In still other examples, the TRS is only transmitted when a PDSCH is transmitted.

Implementation examples are described in the following numbered clauses.

1. A method of wireless communication by a base station, comprising:
   configuring a tracking reference signal (TRS) with respect to a paging occasion for an idle mode user equipment (UE) or an inactive mode UE; and
   transmitting the TRS during a paging cycle corresponding to the paging occasion, in accordance with the configuring.
2. The method of clause 1, further comprising configuring the TRS to be time division multiplexed with a physical downlink shared channel (PDSCH) during the paging cycle, the PDSCH corresponding to the paging occasion.
3. The method of clause 1 or 2, further comprising configuring the TRS to be at least partially frequency division multiplexed with a physical downlink shared channel (PDSCH) during the paging cycle, the PDSCH corresponding to the paging occasion.
4. The method of any of the preceding clauses, further comprising partitioning a group of UEs belonging to the paging occasion into a plurality of groups.
5. The method of any of the preceding clauses, further comprising configuring a different TRS for each of the plurality of groups.
6. The method of any of the preceding clauses, further comprising scheduling a physical downlink shared channel (PDSCH) at least one slot after a slot where associated downlink control information (DCI) for paging indication is transmitted.
7. The method of any of the preceding clauses, further comprising transmitting a wake-up signal within a physical downlink control channel (PDCCH), the wake-up signal instructing the UE to later monitor for the paging occasion.
8. The method of any of the preceding clauses, in which the wake-up signal aligns with the TRS.
9. The method of any of the preceding clauses, in which the TRS instructs the UE to later monitor for the paging occasion.
10. The method of any of the preceding clauses, further comprising transmitting the TRS when a physical downlink shared channel (PDSCH) is transmitted.
11. The method of any of the preceding clauses, further comprising aligning the paging occasion with a slot for paging downlink control information (P-DCI) monitoring.
12. The method of any of clauses 1-10, further comprising aligning the paging occasion with a slot where a physical downlink shared channel (PDSCH) could potentially arrive.
13. A method of wireless communication, by a user equipment (UE), comprising:
   monitoring for a tracking reference signal (TRS) during a period when a physical downlink shared channel (PDSCH) is received.
14. The method of clause 13, in which the TRS and the PDSCH overlap in time.
15. The method of clause 13 or 14, further comprising monitoring for paging downlink control information (P-DCI) at a slot assigned for a paging occasion.
16. The method of any of the clauses 13-14, further comprising monitoring for a paging occasion at a slot where the PDSCH could potentially arrive.
17. An apparatus of a base station for wireless communication, comprising:
   a memory, and
   at least one processor operatively coupled to the memory, the memory and the at least one processor configured:
      to configure a tracking reference signal (TRS) with respect to a paging occasion for an idle mode user equipment (UE) or an inactive mode UE; and
      to transmit the TRS during a paging cycle corresponding to the paging occasion, in accordance with the configuring.
18. The apparatus of clause 17, in which the at least one processor is further configured to configure the TRS to be time division multiplexed with a physical downlink shared channel (PDSCH) during the paging cycle, the PDSCH corresponding to the paging occasion.
19. The apparatus of clause 17 or 18, in which the at least one processor is further configured to configure the TRS to be at least partially frequency division multiplexed with a physical downlink shared channel (PDSCH) during the paging cycle, the PDSCH corresponding to the paging occasion.
20. The apparatus of any of the preceding clauses 17-19, in which the at least one processor is further configured to partition a group of UEs belonging to the paging occasion into a plurality of groups.
21. The apparatus of any of the preceding clauses 17-20, in which the at least one processor is further configured to configure a different TRS for each of the plurality of groups.
22. The apparatus of any of the preceding clauses 17-21, in which the at least one processor is further configured to schedule a physical downlink shared channel (PDSCH) at least one slot after a slot where associated downlink control information (DCI) for paging indication is transmitted.
23. The apparatus of any of the preceding clauses 17-22, in which the at least one processor is further configured to transmit a wake-up signal within a physical downlink control channel (PDCCH), the wake-up signal instructing the UE to later monitor for the paging occasion.

24. The apparatus of any of the preceding clauses 17-23, in which the wake-up signal aligns with the TRS.
25. The apparatus of any of the preceding clauses 17-24, in which the TRS instructs the UE to later monitor for the paging occasion.
26. The apparatus of any of the preceding clauses 17-25, in which the at least one processor is further configured to transmit the TRS when a physical downlink shared channel (PDSCH) is transmitted.
27. The apparatus of any of the preceding clauses 17-26, in which the at least one processor is further configured to align the paging occasion with a slot for paging downlink control information (P-DCI) monitoring.
28. The apparatus of any of the preceding clauses 17-26, in which the at least one processor is further configured to align the paging occasion with a slot where a physical downlink shared channel (PDSCH) could potentially arrive.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a base station, comprising:
   configuring time and/or frequency resources for a pattern of a tracking reference signal (TRS) with respect to a paging occasion for an idle mode user equipment (UE) or an inactive mode UE, the pattern of the TRS including a first set of signals in a first slot that occurs before a second slot, the first slot including the first set of signals of the TRS, and the second slot comprising a wake-up signal and a second set of signals of the TRS, the second set of signals aligned with the wake-up signal in the second slot; and
   transmitting the TRS during a paging cycle corresponding to the paging occasion, in accordance with the configuring, the transmitting of the TRS occurring in response to a physical downlink shared channel (PDSCH) being transmitted and the transmitting not occurring when the PDSCH is not transmitted.

2. The method of claim 1, further comprising configuring the TRS to be time division multiplexed with the physical downlink shared channel (PDSCH) during the paging cycle, the PDSCH corresponding to the paging occasion.

3. The method of claim 1, further comprising configuring the TRS to be at least partially frequency division multiplexed with the physical downlink shared channel (PDSCH) during the paging cycle, the PDSCH corresponding to the paging occasion.

4. The method of claim 1, further comprising partitioning a group of UEs belonging to the paging occasion into a plurality of groups.

5. The method of claim 4, further comprising configuring a different TRS for each of the plurality of groups.

6. The method of claim 1, further comprising scheduling the physical downlink shared channel (PDSCH) at least one slot after a slot where associated downlink control information (DCI) for paging indication is transmitted.

7. The method of claim 1, further comprising transmitting the wake-up signal within a physical downlink control channel (PDCCH), the wake-up signal instructing the UE to later monitor for the paging occasion.

8. The method of claim 1, in which the TRS instructs the UE to later monitor for the paging occasion.

9. The method of claim 1, further comprising aligning the paging occasion with a slot for paging downlink control information (P-DCI) monitoring.

10. The method of claim 1, further comprising aligning the paging occasion with a slot where the physical downlink shared channel (PDSCH) could potentially arrive.

11. A method of wireless communication, by a user equipment (UE), comprising:
    monitoring for tracking reference signal (TRS) during a period when a physical downlink shared channel (PDSCH) is received, the TRS not arriving when the PDSCH is not received, the TRS having a TRS pattern including a first set of signals in a first slot before a second slot, the first slot including the first set of signals of the TRS, and the second slot including a wake-up signal and a second set of signals of the TRS, the second set of signals aligned with the wake-up signal in the second slot.

12. The method of claim 11, in which the TRS and the PDSCH overlap in time.

13. The method of claim 11, further comprising monitoring for a paging downlink control information (P-DCI) at a slot assigned for a paging occasion.

14. The method of claim 11, further comprising monitoring for a paging occasion at a slot where the PDSCH could potentially arrive.

15. An apparatus of a base station for wireless communication, comprising:
a memory, and
at least one processor operatively coupled to the memory, the memory and the at least one processor configured:
to configure time and/or frequency resources for a pattern of a tracking reference signal (TRS) with respect to a paging occasion for an idle mode user equipment (UE) or an inactive mode UE, the pattern of the TRS including a first set of signals in a first slot before a second slot, the first slot including the first set of signals of the TRS, and the second slot comprising a wake-up signal and a second set of signals of the TRS, the second set of signals aligned with the wake-up signal in the second slot; and
to transmit the TRS during a paging cycle corresponding to the paging occasion, in accordance with the configuring, the transmitting of the TRS occurring in response to a physical downlink shared channel (PDSCH) being transmitted and the transmitting not occurring when the PDSCH is not transmitted.

16. The apparatus of claim 15, in which the at least one processor is further configured to configure the TRS to be time division multiplexed with the physical downlink shared channel (PDSCH) during the paging cycle, the PDSCH corresponding to the paging occasion.

17. The apparatus of claim 15, in which the at least one processor is further configured to configure the TRS to be at least partially frequency division multiplexed with the physical downlink shared channel (PDSCH) during the paging cycle, the PDSCH corresponding to the paging occasion.

18. The apparatus of claim 15, in which the at least one processor is further configured to partition a group of UEs belonging to the paging occasion into a plurality of groups.

19. The apparatus of claim 18, in which the at least one processor is further configured to configure a different TRS for each of the plurality of groups.

20. The apparatus of claim 15, in which the at least one processor is further configured to schedule the physical downlink shared channel (PDSCH) at least one slot after a slot where associated downlink control information (DCI) for paging indication is transmitted.

21. The apparatus of claim 15, in which the at least one processor is further configured to transmit the wake-up signal within a physical downlink control channel (PDCCH), the wake-up signal instructing the UE to later monitor for the paging occasion.

22. The apparatus of claim 21, in which the wake-up signal aligns with the TRS.

23. The apparatus of claim 15, in which the TRS instructs the UE to later monitor for the paging occasion.

24. The apparatus of claim 15, in which the at least one processor is further configured to align the paging occasion with a slot for paging downlink control information (P-DCI) monitoring.

25. The apparatus of claim 15, in which the at least one processor is further configured to align the paging occasion with a slot where the physical downlink shared channel (PDSCH) could potentially arrive.

26. An apparatus of a user equipment (UE) for wireless communication, comprising:
a memory, and
at least one processor operatively coupled to the memory, the memory and the at least one processor configured to monitor for a tracking reference signal (TRS) during a period when a physical downlink shared channel (PDSCH) is received, the TRS not arriving when the PDSCH is not received, the TRS having a TRS pattern including a first set of signals in a first slot before a second slot, the first slot including the first set of signals of the TRS, and the second slot including a wake-up signal and a second set of signals of the TRS, the second set of signals aligned with the wake-up signal in the second slot.

27. The UE of claim 26, in which the TRS and the PDSCH overlap in time.

* * * * *